J. LEICHT, JR

BAG HOLDER

Oct. 28, 1930.

Re. 17,848

Original Filed March 19, 1928 2 Sheets-Sheet 1

INVENTOR.

John Leicht Jr.,

BY E. W. Anderson Jr.

ATTORNEY.

J. LEICHT, JR

BAG HOLDER

Oct. 28, 1930.

Re. 17,848

Original Filed March 19, 1928 2 Sheets-Sheet 2

INVENTOR.

John Leicht, Jr.

E. W. Anderson for

ATTORNEY.

Reissued Oct. 28, 1930 Re. 17,848

UNITED STATES PATENT OFFICE

JOHN LEICHT, JR., OF BURLINGTON, IOWA

BAG HOLDER

Original No. 1,723,794, dated August 6, 1929, Serial No. 262,749, filed March 19, 1928. Application for reissue filed July 18, 1930. Serial No. 468,962.

The invention has for its object the provision of an improved bag holder which may be supported from a store counter out of the way and carry a large supply of bags of assorted sizes within convenient reach and from which a bag of the desired size may be readily withdrawn.

Other objects and advantages will hereinafter appear.

Reference is made to my Patent No. 1,640,084, dated August 23, 1927, upon which the present application is an improvement.

The invention consists in the novel construction and combination of parts as pointed out in the appended claims.

Figure 1:
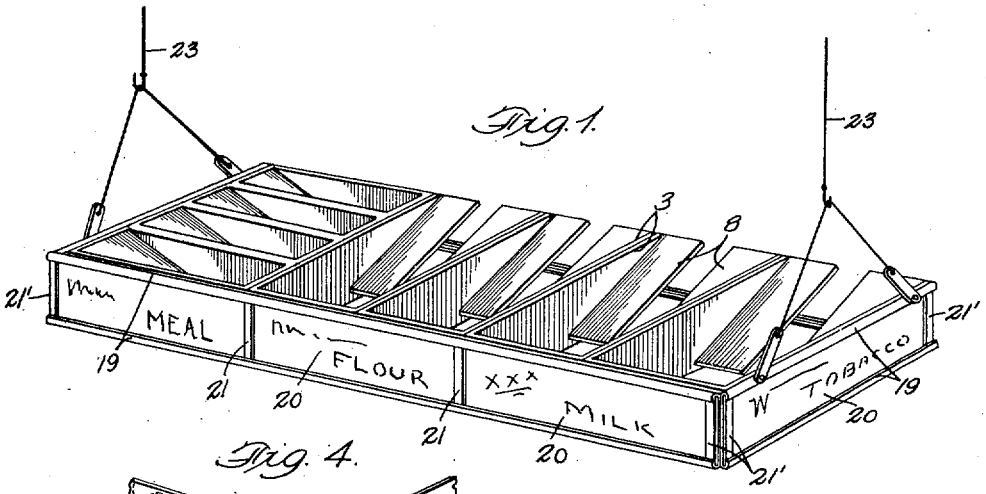
Figure 4:
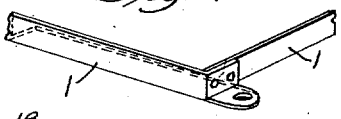
Figure 2:
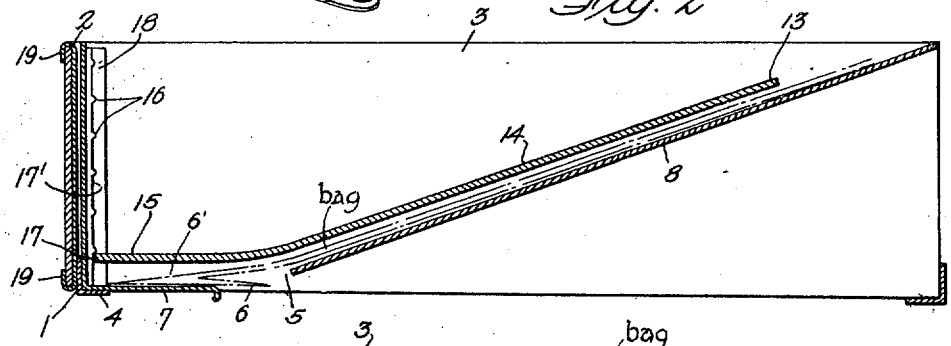
Figure 3:
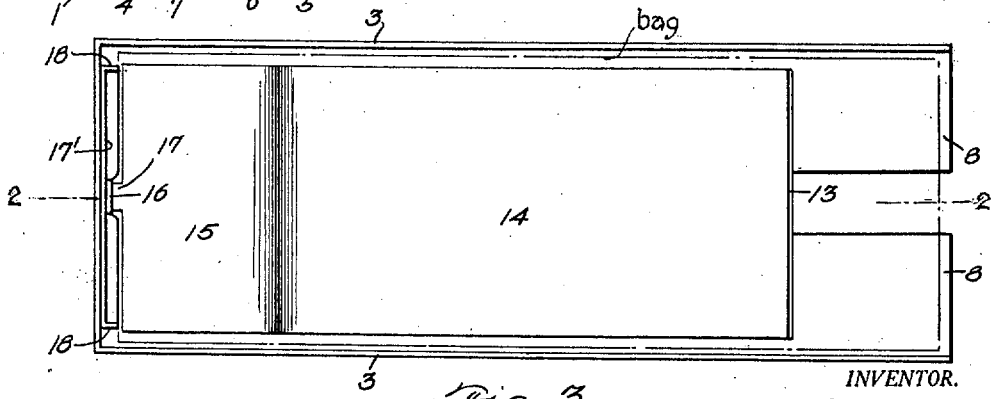
Figure 5:
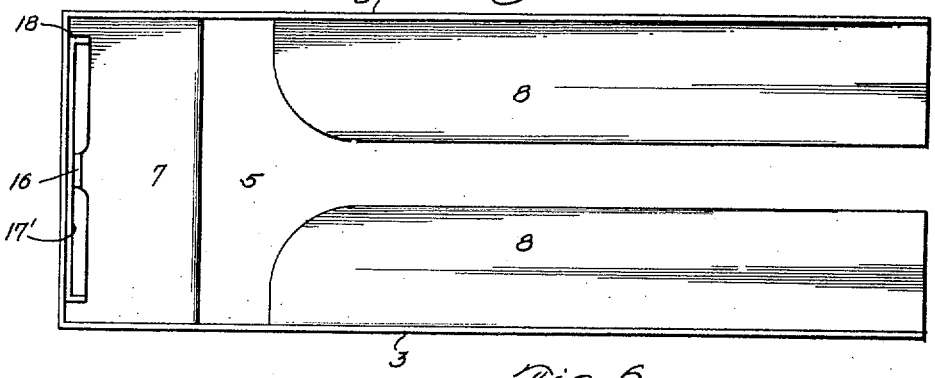
Figure 6:
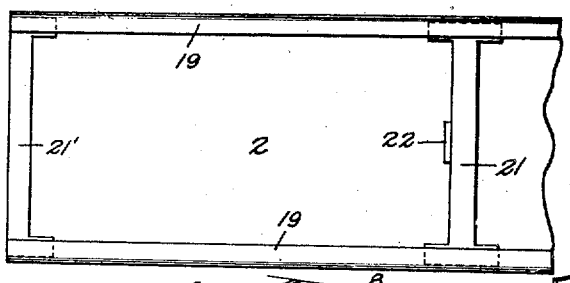
Figure 7:
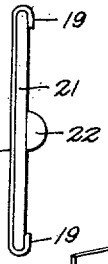
Figure 8:
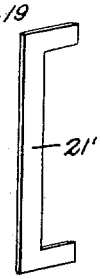
Figure 11:
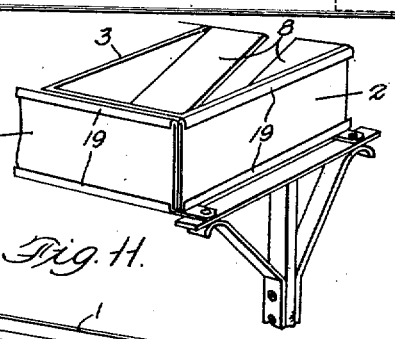
Figure 9:
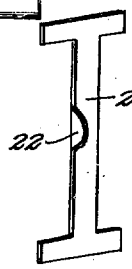
Figure 10:
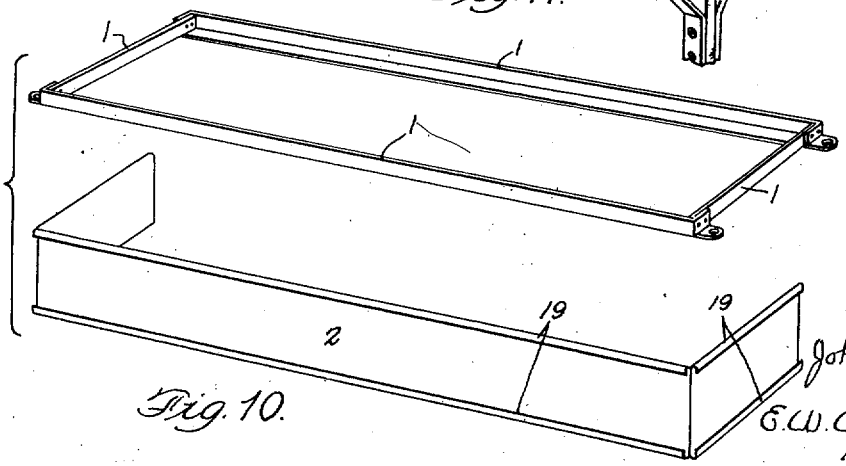

In the accompanying drawings illustrating an embodiment of the invention, Figure 1 is a perspective view of the bag holder; Figure 2 is a detail section of one of the containers on the line 2—2, Figure 3; Figure 3 is a detail plan view of one of the containers with weight therein and showing a bag in dotted lines; Figure 4 is a detail perspective fragmentary view of a corner joint of the skeleton frame; Figure 5 is a detail view similar to Figure 3 with the weight removed; Figure 6 is a detail fragmentary front view of the apron, showing the spacers; Figure 7 is a detail end view of the same; Figure 8 and Figure 9 are detail perspective views of the spacers; Figure 10 shows detail perspective views of the skeleton frame and the apron separate from each other, and Figure 11 is a detail perspective fragmentary view of one end portion of the bag holder supported from a standard.

In these drawings the numeral 1 designates a supporting frame or rack of flat horizontal skeleton form, comprising preferably front and rear angle bars connected at the ends by transverse strap bars, the angle bars being turned inwardly to provide horizontal flanges whereon the bag containers will rest. The ends of the angle bars are split at the ends and one split end turned at right angles and joined to the strap metal end and the other split part extending horizontally and affording a means whereby the rack may be secured to a supporting standard.

An upstanding front and ends for the horizontal rack is provided by a sheet metal apron 2, consisting of a front plate and two end plates at right angles thereto, being secured in any suitable manner to said rack, the purpose of said apron and its particular construction being hereafter referred to.

Placed in the rack or frame 1 are separate containers 3 for the bags, these containers being located side by side in longitudinal series, and being supported in front and rear by the horizontal inturned flanges 4 of the front and rear frame bars of the rack 1.

These containers are graduated in size and designed to hold paper bags of assorted sizes. Each container has side walls, a front end wall, an open top, and a bottom provided with a slot 5 to permit the withdrawal of the bags, the latter being placed in the container with the bottom flaps 6 of the pile of bags overlying said slot, the bottom flap of the lowermost bag being exposed through said slot and being grasped and pulled when a bag is to be withdrawn, the pulling movement being downwardly through the slot 5.

It will be noted by reference to Figure 5 of the drawings that the slot 5 is T-shaped, the stem of the T extending along the median longitudinal line of the container and through substantially the entire length of the container. The slot 5 is defined by a bottom front plate 7 bounding one side of the head of the T, and two parallel spaced bottom rear plates 8, 8, spaced from each other to define the sides of the stem of the T and spaced from plate 7 to, with said front plate, define the head of the T form slot. The plates 8, 8, of each container are each secured to a side of the container in an inclined position, being higher in rear than in front, and higher at its front end than is the upper surface of front plate 7. The degree of incline of rear bottom plates 8 is governed by the wedge shape of a pile of bags of a given size placed in the container, so that when the container is loaded to capacity the topmost bag will be horizontal.

The inclined position of the rear bottom plates 8 of the container causes the pile of bags therein to shift forward and downward, coming to rest against the forward end wall of the container, thus doing away with the need of a support or wall at rear end of container to hold the bags in proper position within the container.

The inclined position of the rear bottom plates 8 of the container whereon rest the sides of the bags, raises said sides above the bottoms of the bags the front portions of said bottoms overlying and being supported upon front bottom plate 7, said bag bottoms comprising each two oppositely projecting flaps 6 and 6′, of which one, namely 6′, comes to rest upon said front bottom plate and the other 6, projects through the head of the T form slot 5, this being due to the fact that the bottom front plate 7 is located below the front end of the bottom rear plates 8, 8.

The flap 6 exposed and projecting through the head of the T form slot 5 is readily grasped when it is desired to remove a bag from the container. To avoid tearing of the bags in removing the same, the opposite front edges of the plates 8, 8, are made curved or convex, as shown in Figure 5, at 12.

When a bag is grasped by its bottom flap 6 and drawn downwardly through the T form slot 5, it is engaged by the inner edges of the bottom rear plates 8, 8, to bend the bag in its longitudinal center away from the next overlying bag, this collapsing or partial folding of the bag overcoming any adhesion between it and the next overlying bag.

In order to retard the elastic upward movement of a pile of bags placed in the container and to keep the pile of bags pressed forwardly of the container, resisting backward and upward movement thereof, there is provided for each container a weight 13 designed to rest upon the pile of bags therein and comprising a rear body portion 14 designed when in lowermost position as shown in Figure 2, to assume the same or a similar inclination to that of the plates 8, and a front portion 15 bent at an obtuse angle with respect to said body portion and designed to, in said lowermost position, assume a horizontal position parallel to the front bottom plate 7.

In order to positively resist upward movement of the front end of the weight 13 and of the pile of bags compressed thereby, the front end of each container is provided with a vertical series of spaced seats or indentations 16 engageable by a front projection or tooth 17 of said weight, being similar to a rack and pawl engagement, the pawl having sliding engagement with the teeth of the rack. Preferably the seats or rack teeth 16 will be formed in an upright sheet metal plate 17′ secured to the front inner wall of container, and having opposite spaced lateral upstanding flanges 18, against which the forward ends of the bags abut to prevent the same from contacting with the spaced seats 16 (see Figure 3).

The apron 2 covering the front and two ends of the rack, being an integral member having angularly bent ends, is provided with reversely bent upper and lower flanges providing upper and lower grooves 19, wherein advertising display cards 20 may be inserted readily and as readily removed.

In order to space different display cards, spacers 21 of double channel or U form may be slid in the grooves 19, certain spacers 21′ to be of single U or channel form, and located at the corners of the apron, and the others 21, of double U or channel form to be located between the display cards at intermediate points along the front of the apron. In order to facilitate the movement of these spacers in the grooves of the apron, each spacer may have out-turned lugs 22 whereby it may be engaged and shoved to one side or the other.

The rack is designed to be either suspended from the ceiling or other fixed support by suitable chains 23 engaging the ends of the apron 2 or supported upon suitable standards 24 adjustable or otherwise and located upon a counter or other support, the angle bars of the racks having horizontal end lugs adapted to be secured to said standards.

The invention is of simple construction, capable of economical manufacture, and will maintain a large supply of bags of assorted sizes within convenient reach of the salesman without curtailing space required for display or storage upon or beneath counter or interfering with the movement of clerks or customers.

The containers may be each readily removed from the rack for replenishing supply of bags when needed by withdrawing the container through the open rear end of the combined rack and apron.

The supply of bags is visible at all times through the open tops of the containers.

Four small size containers 3′ are nested in one container 3 at right angles thereto at one end of the rack 1, thereby reducing the length of the rack for a full supply of assorted size bags.

I claim:—

1. A bag holder comprising a container having a front end, sides and a bottom including a front bottom plate adapted to support the front portion of a bag bottom and two longitudinally inclined rear bottom plates secured to the sides of said container and extending upwardly to the top of said rear end and adapted to support the sides of the bag, said rear plates being spaced from each other and from said front plate to define a T-form slot the head of which underlies the rear portion of the bag bottom, the lower ends of said rear plates being located above said front plate to cause the projection through the head of said slot of the bottom flap of the rear portion of said bag bottom, the inclined bottom of said container causing the pile of bags therein to shift forwardly and downwardly against said front end wall and the uppermost bag of a pile to be horizontal.

2. A bag holder comprising a container having ends and sides, a front bottom plate and a longitudinally inclined rear bottom plate secured to its sides, said rear plate being spaced from said front plate to define a slot from which bags in the container may be withdrawn, the inclination of said rear plate being such that the pile of bags will be shifted forward and downward and when the container is loaded to capacity the uppermost bag will be horizontal, a weight designed to facilitate the downward movement of bags in the container, and means engaging said weight for resisting upward movement of the forward ends of said bags.

3. A bag holder comprising a container having ends and sides, a front bottom plate and a longitudinally inclined rear bottom plate secured to its sides, said rear plate being spaced from said front plate to define a slot from which bags in the container may be withdrawn, the inclination of said rear plate being such that the pile of bags will be shifted forward and downward and when the container is loaded to capacity the uppermost bag will be horizontal, a weight designed to facilitate forward and downward movement of bags in the container and having a tooth and means engaging said tooth for resisting upward movement of the forward ends of said bags and consisting of a metal plate secured to the front wall of the container and having a vertical series of spaced seats any one of which is engageable by said tooth.

4. A bag holder comprising a container having ends and sides, a front bottom plate and a longitudinally inclined rear bottom plate secured to said sides, said rear plate being spaced from said front plate to define a slot from which bags in the container may be withdrawn, the inclination of said rear plate being such that the pile of bags will be shifted forward and downward and when the container is loaded to capacity the uppermost bag will be horizontal, a weight designed to facilitate forward downward movement of bags in the container and having a tooth and means engaging said tooth for resisting upward movement of the forward ends of said bags and consisting of a metal plate secured to the front wall of the container and having a vertical series of spaced seats any one of which is engageable by said tooth, said metal plate having opposite upstanding lateral guide flanges engageable by the forward ends of the bags, and facilitating their downward movement in the container.

In testimony whereof I affix my signature.

JOHN LEICHT, Jr.